United States Patent [19]

Van der Meer et al.

[11] Patent Number: 4,933,759
[45] Date of Patent: Jun. 12, 1990

[54] METHOD OF AND ARRANGEMENT FOR MOTION DETECTION IN AN INTERLACED TELEVISION PICTURE OBTAINED AFTER FILM-TO-TELEVISION CONVERSION

[75] Inventors: Jan Van der Meer; Franciscus W. P. Vreeswijk, both of Eindhoven, Netherlands

[73] Assignee: U.S. Philips Corporation, New York, N.Y.

[21] Appl. No.: 344,194

[22] Filed: Apr. 27, 1989

[30] Foreign Application Priority Data

May 26, 1988 [NL] Netherlands .......................... 8801347

[51] Int. Cl.$^5$ .............................................. H04N 7/01
[52] U.S. Cl. .................................... 358/105; 358/214
[58] Field of Search ................. 358/105, 140, 97, 214, 358/54

[56] References Cited

U.S. PATENT DOCUMENTS

| | | | |
|---|---|---|---|
| 4,288,815 | 9/1981 | Miles . | |
| 4,607,281 | 8/1986 | Starck . | |
| 4,633,293 | 12/1987 | Powers | 358/140 X |
| 4,672,442 | 6/1987 | Yamaguchi et al. | 358/105 X |
| 4,680,638 | 7/1987 | Childs | 358/214 |

FOREIGN PATENT DOCUMENTS 2165417  4/1986  United Kingdom .

*Primary Examiner*—James J. Groody
*Assistant Examiner*—Victor R. Kostak
*Attorney, Agent, or Firm*—Edward W. Goodman

[57] ABSTRACT

Motion detection is based on picture signal value comparisons between picture elements (P) in consecutive, interlaced television pictures (n−2, n−1), (n, n+1), (n+2, N+3), motion or no motion, respectively, being determined in dependence on the fact whether comparison results exceed or do not exceed a threshold value. Changes in picture information between movie pictures (MP1, MP2, MP3) can negatively influence the telecine television motion detection if they make use of a preceding and a subsequent television picture. To prevent this, an instantaneous picture element (P1) in a first field (n) of a television picture (n, n+1) is compared with a number (P4, P5, P6, P7) of surrounding picture elements in a second field (n+1) and an instantaneous picture element (P11) in the second field N+1) is compared with a number (P14, P15, P16, P17) of surrounding picture elements in the first field (n).

5 Claims, 2 Drawing Sheets

METHOD OF AND ARRANGEMENT FOR MOTION DETECTION IN AN INTERLACED TELEVISION PICTURE OBTAINED AFTER FILM-TO-TELEVISION CONVERSION

BACKGROUND OF THE INVENTION

1. Field of the Invention

The invention relates to a method of motion detection in an interlaced television picture obtained after film-to-television conversion, the method being based on picture signal comparison between picture elements in consecutive television pictures which are assembled line and field-sequentially in frame periods consisting of two field periods, in the method, starting from a picture element in the television picture the picture signal value thereof being compared with those of a corresponding picture element in the preceding and the subsequent television picture and with those of a number of surrounding picture elements, motion or no motion, respectively, being determined in dependence on the fact whether comparison results exceed or do not exceed a threshold value.

The invention also relates to an arrangement suitable for performing such a method.

2. Description of the Related Art

Motion detection can be utilized for various purposes. For a television transmission channel having a bandwidth which is more limited than the bandwidth of the television signal source, the motion detection can be used for a bandwidth reduction of the signal to be transmitted. During television signal conversion from one standard to another, the motion detection can be used to provide an improved picture quality on display of the converted picture signal.

When the television signal source includes a film-to-television converter (telecine), the specific structure of the picture signal can then be used for an optimum motion detection since it is a known technique to convert 24 movie picture frames per second into 25 or 30 interlaced television pictures or frames per second, by coupling the television pictures to the film frames, so that picture information changes between consecutive film frames can only occur between predetermined television pictures. In the case of single interlace using two fields per television picture or frame, the picture information components per two fields are always identical.

SUMMARY OF THE INVENTION

To provide an optimum motion detection based on picture signal value comparisons with a preceding and a subsequent television picture, a method according to the invention, is characterized, in that picture signal comparisons between an instantaneous picture element of a first or a second field, respectively, of each interlaced television picture and a number of surrounding picture elements are effected between the instantaneous picture element and the number of picture elements present in the second or first field, respectively, of the interlaced television picture.

For a telecine television motion detection operative with a preceding and subsequent television picture, the signal source including a film-to-television converter, this specific choice always results in an optimum detection.

An arrangement for performing the method which includes a memory of the respective storage and delay of the picture signal values of the picture elements of at least two television pictures, and a first and a second signal comparison and threshold circuit coupled to the memory for performing the picture signal value comparisons, is characterized in that the memory comprises at least five field memories and from its outputs supplies the picture signal values of six consecutive fields (n−2), (n−1), n, (n+1), (n+2) and (n+3) of picture elements of three television pictures, the arangement including a first and a second change-over device via which inputs of the first and second signal comparison and threshold circuits, respectively, are coupled at the frame frequency to memory outputs for supplying the signal picture values of the picture elements of the fields (n−2), (n−1) and (n+2), (n+3), respectively, whereas further inputs of the first and second signal comparison and threshold circuits are coupled to memory outputs for supplying the picture signal values of the picture elements of the fields (n) and (n+1).

BRIEF DESCRIPTION OF THE DRAWING

The invention will now be described in greater detail by way of example with reference to the accompanying drawing, in which.

DESCRIPTION OF THE PREFERRED EMBODIMENT

Figure 1:
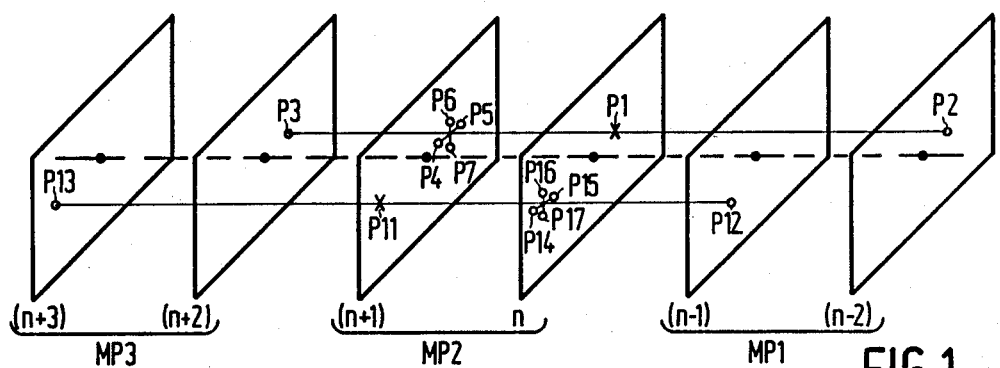
FIG. 1 shows, by way of illustration of the method according to the invention, six schematically drawn fields of picture elements.

FIG. 1 shows six television fields of sequentially occurring picture elements, denoted by (n−2), (n−1), n, (n+1), (n+2) and (n+3). Let the fields (n−2) and (n−1) belong to an interlaced television picture which corresponds to one motion picture frame MP1. The same holds for the fields n, (n+1) and (n+2), (n+3), respectively, which belong to motion picture frames MP2 and MP3, respectively. This results in that picture information changes can only occur between television pictures (n−2, n−1), (n, n+1) and (n+2, n+3), with a first field (n−2), n and (n+2), respectively, and a second field (n−1), (n+1) and (n+3). The picture information in the fields (n−2) and (n−1), n and (n+1), and (n+2) and (n+3), respectively, is the same, the only difference being that as a result of the interlace the picture elements at the line and field-sequential structure have been shifted into the field direction.

In FIG. 1 it is assumed that during the occurrence of the first field n, an instantaneous picture element at which motion is to be detected, is denoted by P1 and a cross. Likewise, during the second field (n+1) there is an instantaneous picture element P11 (cross). A picture element corresponding to P1, in the preceding picture (n−2, n−1) and in the subsequent picture (n+2, n+3) is denoted by P2 and P3, respectively, and a circle. A number of picture elements P4, P5, P6 and P7 (circles), surrounding the picture element P1, in the picture (n, n+1), are denoted by (P4, P5, P6, P7). The picture elements P4 and P5 occur in the picture (n, n+1) in the line or horizontal direction, whereas the picture elements P6 and P7 are located in the field or vertical direction. In a similar manner, corresponding picture elements P12 and P13 and a plurality (P14, P15, P16, P17) of surrounding picture elements, represented by circles, are shown at the instantaneous picture element P11. In the example four surrounding picture elements are used, but larger numbers are alternatively possible.

For the motion detection, picture signal values associated with the picture elements P are compared with each other and motion or no motion, respectively, is determined when a threshold value is exceeded or not exceeded. In this situation comparison results can be combined via logic OR- and/or AND-functions to enable an optimum decision whether there is motion or no motion. Examples thereof are an element-by-element comparison (P1, P2) or (P1, P3), an element-by-element-group comparison (P1 relative to P4, P5, P6 and P7), these results thereafter being correlated with the results obtained within a block of elements each having their own comparison results. The same may hold for the elements P11 to P17, inclusive. The manner in which the comparison results are processed is not essential to the invention. A feature essential to the invention is the choice of which of the picture elements are to be compared to each other. This choice is illustrated in FIG. 1 and implies that the picture signal value comparison between the instantaneous picture element P1 and P11, respectively, of the first (n) and second (n+1) fields, respectively, of the interlaced television picture (n, n+1) are effected using the number of respective picture elements (P4, P5, P6, P7) and (P14, P15, P16, P17) present in the second (n+1) and first (n) fields, respectively, of the interlaced television picture (n, n+1). This choice results in an optimum motion detection as picture information changes are absent between the fields n and (n+1). For the instantaneous picture element P1 only the information of the corresponding picture element P2 is derived from the preceding picture (n−2, n−1). For the instantaneous picture element P11 information of the corresponding picture element P13 is only derived from the subsequent picture (n+2, n+3). Consequently picture information changes between the motion picture frames do not affect the motion detection.

Figure 2:
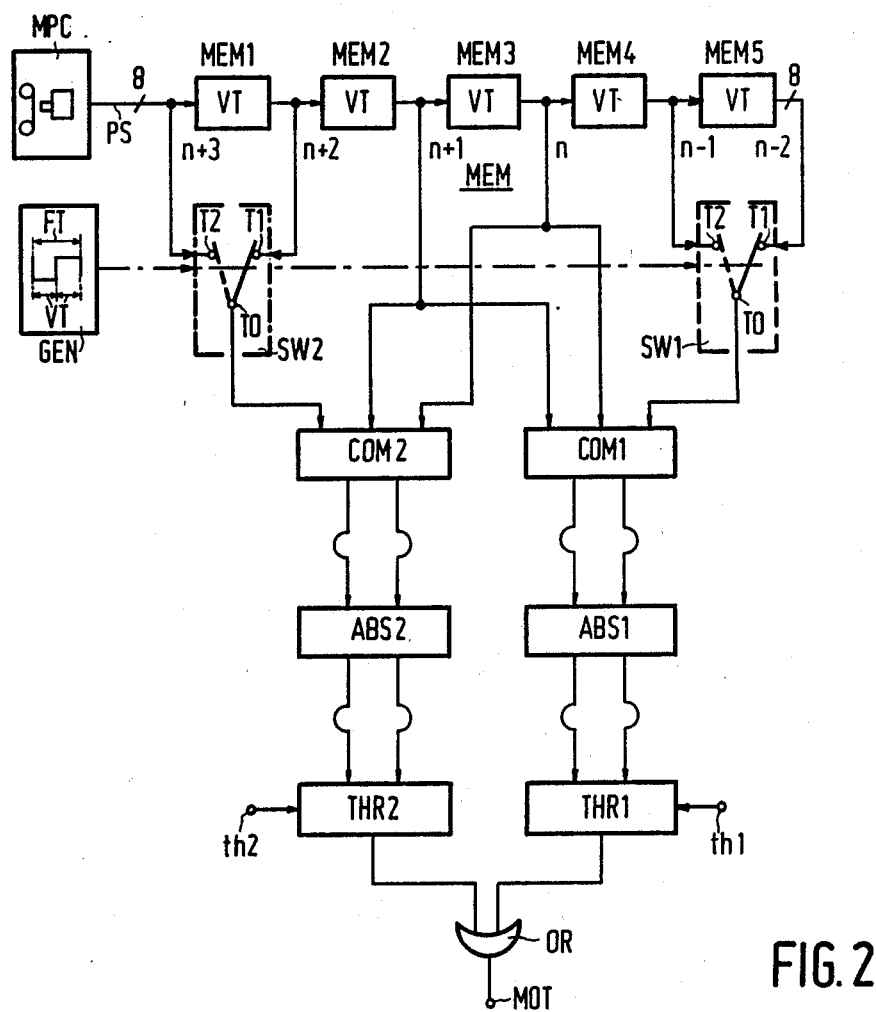
FIG. 2 is a block circuit diagram of an arrangement according to the invention.

FIG. 2 is a block diagram of a construction of an arrangement according to the invention for performing the method of the invention illustrated by FIG. 1. MPC denotes a film-to-television converter or telecine apparatus, in which in outline a film reproduction and a television recording are shown. The converter MPC supplies a picture signal PS which is, for example, digitized by 8-bits on an eight-fold output. The picture signal PS with picture signal values associated with the picture elements P of FIG. 1 is applied to a memory MEM for storing and delaying, respectively, the picture signal values. The Figure shows a construction of the memory MEM with a series arrangement of five field memories MEM1 to MEM5, inclusive, in the form of delay devices each producing a time delay equal to a field period VT. The memory MEM has six (eight-fold) outputs at which the picture signal values associated with the picture elements P of six consecutive fields (n−2), (n−1), n, (n+1), (n+2) and (n+3) of three television pictures (n−1, n−1), (n, n+1), (n+2, n+3) are present. Instead of the structure shown in FIG. 2 there may a number of, for example, six field memories which are all sequentially connected to the output of the film-to-television converter MPC, five of these memories simultaneously applying the necessary information to the outputs of the memory MEM, whereas the sixth field memory stores an instantaneous picture signal PS.

Independent of the structure of the memory MEM, the memory outputs carrying the picture signal values of the picture elements P of the fields n and (n+1) are coupled to respective inputs of comparison circuits COM1 and COM2. In accordance with a feature of the invention, a further input of each of the circuits COM1 and COM2, respectively, is coupled via respective change-over devices SW1 and SW2 to the memory outputs carrying the picture signal values of the picture elements P of the fields (n−2), (n−1) and (n+2), (n+3), respectively, For the sake of simplicity, the devices SW1 and SW2 are shown as mechanical switches each having a main contact TO and two selector contacts T1 and T2, in actual practice, however, the devices will be electronic devices. The change-over devices SW1 and SW2 are controlled from a switching signal generator GEN. In the block illustrating the generator GEN, a square-wave switching signal is shown having a frame period FT of two field periods VT. The devices SW1 and SW2 switch at the frame frequency and the fields (n−2) and (n+2) are conveyed via the contacts T1 and the fields (n−1) and (n+3) are conveyed via the contacts T2.

Figure 3:
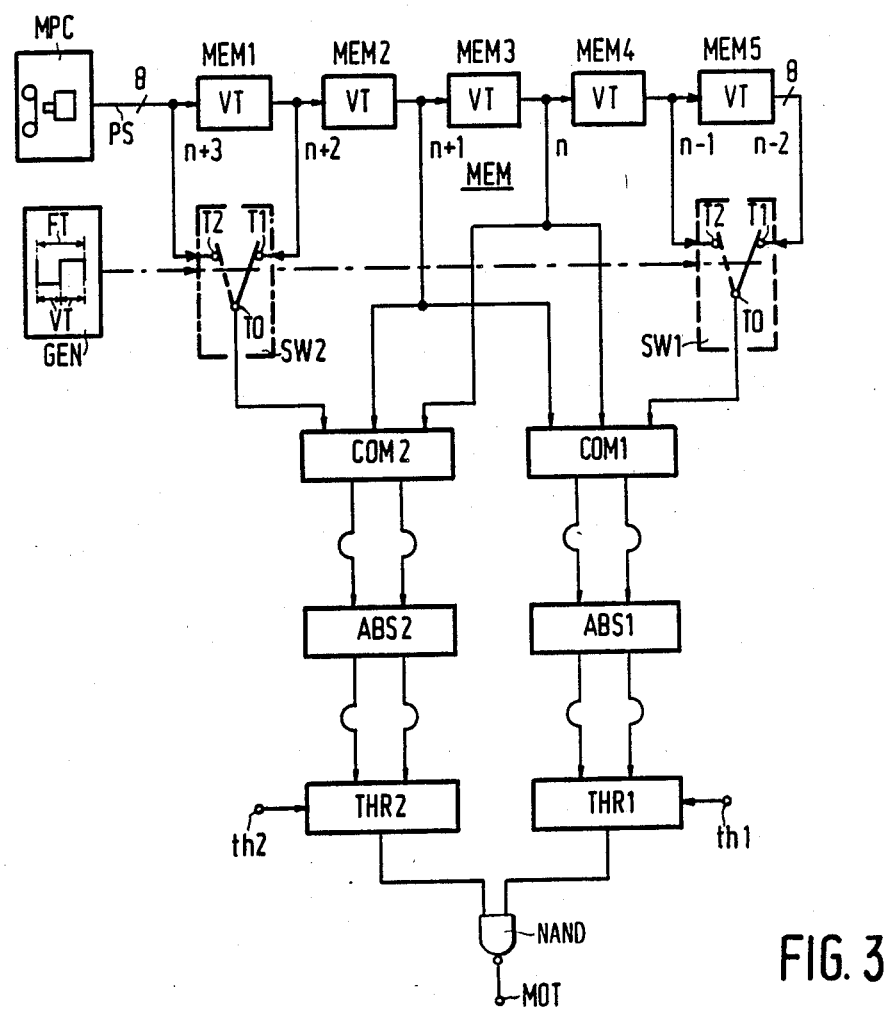
FIG. 3 is a block circuit diagram of an alternate arrangement according to the invention.

The picture signal value comparison circuit COM1 and COM2, respectively, are followed by a respective absolute-value circuits ABS1 and ABS2 and respective threshold circuits THR1 and THR2 subsequent thereto, the Figure showing multiple connection lines. The threshold circuits THR1 and THR2, respectively, are operative with respective threshold values th1 and th2 which can be constant or adaptive, depending on the amplitude of the picture signal value differences. FIG. 2 shows a first and second signal comparison and threshold circuit (COM1, ABS1, THR1) and (COM2, ABS2, THR2), respectively. The outputs of the signal comparison and threshold circuits (COM, ABS, THR) are coupled to inputs of an OR-gate OR. Let it be assumed that if there is motion this corresponds to a logic 1 at the outputs of the threshold circuits THR1 and THR2, so that an output T of the gate OR which is at the same time the output of the arrangement, carries the information indicating motion if at least one logic 1 occurs. Should the detection that there is indeed motion correspond to a logic O originating from the circuits THR1 and THR2, the OR-gate must be replaced by a NAND-gate as shown in FIG. 3. Both cases require an OR-function to arrive at the conclusion that motion is indeed present.

Comparing FIG. 2 or 3 to FIG. 1 shows that during the first fields of television pictures, for example n of the picture (n, n+1), the circuit COM1 is operative with the fields (n−2), n (with the instantaneous picture element P1) and (n+1), and the circuit COM2 is operative with the fields (n+2), n (with the instantaneous picture element P1) and (n+1). During the second fields of the television pictures, for example field (n+1) of the picture (n, n+1), the circuit COM1 is operative with the fields (n−1), (n+1) (with the instantaneous picture element P11) and n, and the circuit COM2 is operative with the fields (n+3), (n+1) (with the instantaneous picture element P11) and n.

We claim:

1. A method for detecting motion in an interlaced television picture obtained after film-to-television conversion, the method being based on picture signal comparison between picture elements in consecutive television pictures which are assembled line and field-sequentially in frame periods consisting of two field periods, the method comprising the steps:
- comparing the picture signal value of an instantaneous picture element in a television picture with those of a corresponding picture element in a preceding television picture and a subsequent television picture;
- comparing the picture signal value of said instantaneous picture element with those of a number of surrounding picture elements; and
- determining motion on whether the above comparisons exceed a threshold value, characterized in that said step of comparing the picture signal value of said instantaneous picture element of a first or a second field, respectively of each interlaced television picture and said number of surrounding picture elements is performed by comparing said instantaneous picture element signal value with those of said number of surrounding picture elements present in the second or first field, respectively, of the interlaced television picture.

2. The method as claimed in claim 1, characterized in that said step or determining motion is is performed by a logic OR function in the processing of the comparison results of the comparisons on the instantaneous picture elements with the preceding and the subsequent television pictures.

3. An arrangement for detecting motion in an interlaced television picture obtained after film-to-television conversion, the motion detection being based on picture signal comparison between picture elements in consecutive television pictures which are assembled line and field-sequentially in frame periods consisting of two field periods, and including comparing the picture signal value of an instantaneous picture element in a television picture with those of a corresponding picture element in a preceding television picture and a subsequent television picture, comparing the picture signal value of said instantaneous picture element with those of a number of surrounding picture elements, and determining motion on whether the above comparisons exceed a threshold value, wherein in comparing the picture signal value of said instantaneous picture element of a first or a second field, respectively, of each interlaced television picture and said number of surrounding picture elements is performed by comparing said instantaneous picture element signal value with those of said number of surrounding picture elements present in the second or first field, respectively, of the interlaced television picture, said arrangement comprising a memory for respectively storing and delaying the picture signal values of the picture elements of at least two television pictures, and a first and a second signal comparison and threshold circuit coupled to said memory for performing the picture signal value comparisons, characterized in that the memory comprises at least five field memories having outputs for supplying the picture signal values of six consecutive fields $(n-2)$, $(n-1)$, $(n)$, $(n+1)$, $(n+2)$ and $(n+3)$ of picture elements of three television pictures, and said arrangement further comprising a first and a second change-over device for coupling, at the frame frequency, inputs of said first and second signal comparison and threshold circuits to memory outputs supplying the picture signal values of the picture elements of the fields $(n-2)$, $(n-1)$ and $(n+2)$, $(n+3)$, respectively, while further inputs of the first and second signal comparison and threshold circuits are coupled to memory outputs supplying the picture signal values of the picture elements of the fields $(n)$ and $(n+1)$.

4. An arrangement as claimed in claim 3, characterized in that outputs of the first and second signal comparison and threshold circuits carrying a logic 1 when motion is detected, are coupled to an output of the arrangement via an OR-gate.

5. An arrangement as claimed in claim 3, characterized in that outputs of the first and second signal comparison and threshold circuits carrying a logic O when motion is detected, are coupled to an output of the arrangement via a NAND-gate.